Aug. 27, 1940.  A. F. HICKMAN  2,213,004
TORSION ROD MOUNTING
Filed Jan. 12, 1939
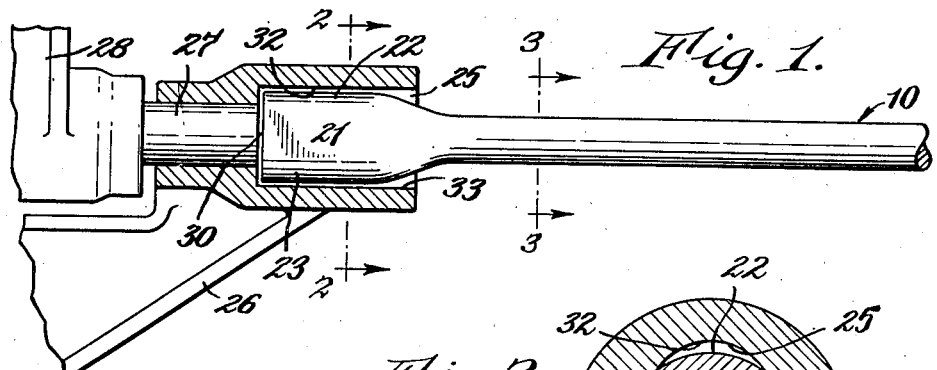
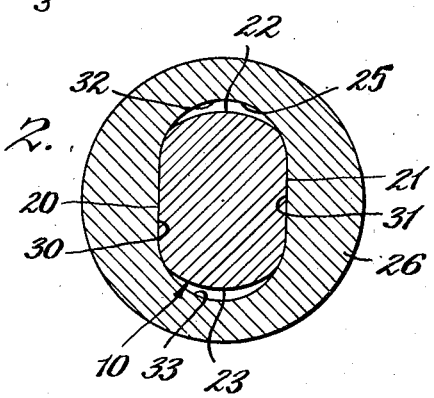
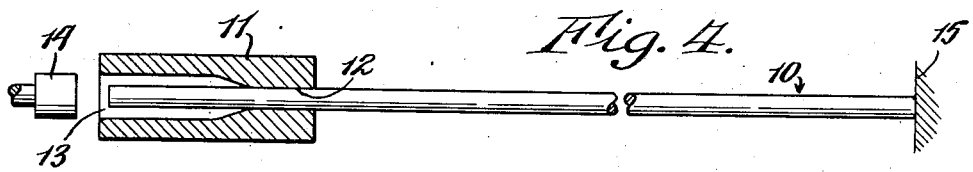
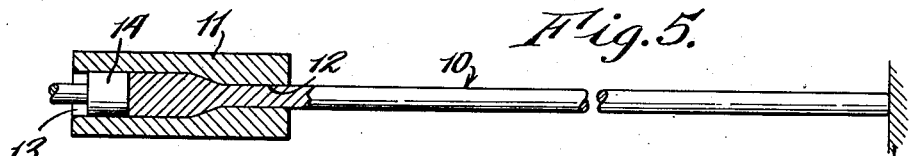
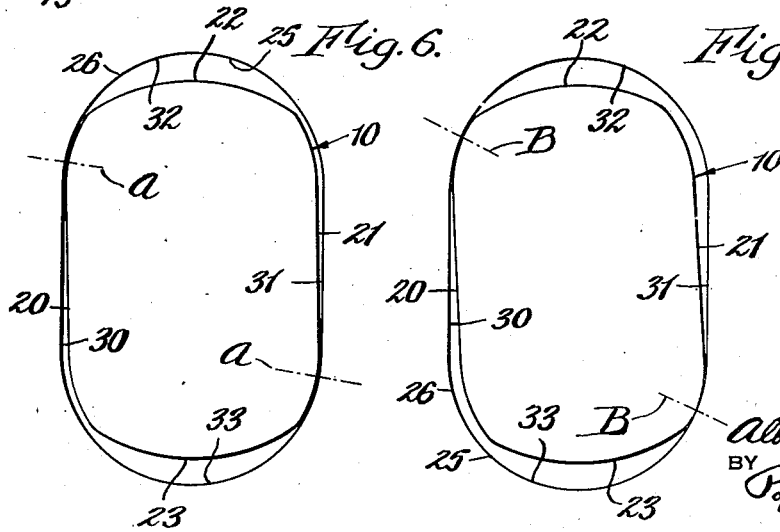
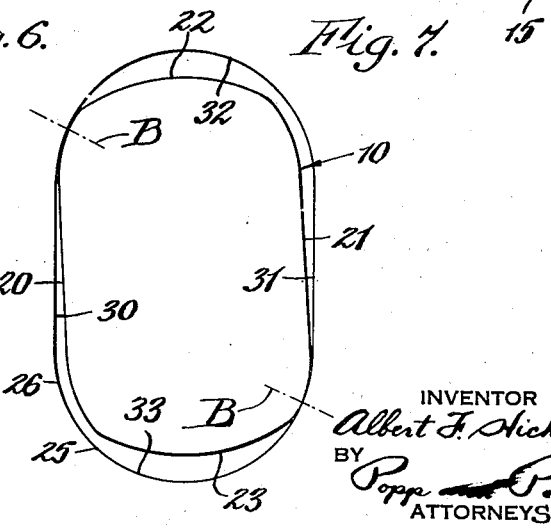
INVENTOR
Albert F. Hickman
BY
Popp and Popp
ATTORNEYS Patented Aug. 27, 1940

2,213,004

UNITED STATES PATENT OFFICE 2,213,004

TORSION ROD MOUNTING

Albert F. Hickman, Eden, N. Y., assignor to Hickman Pneumatic Seat Co. Inc., Eden, N. Y., a corporation of New York Application January 12, 1939, Serial No. 250,581

4 Claims. (Cl. 267—57)

This invention relates to a mounting for torsion rods and more particularly to a mounting for either anchoring the dead end of the torsion rod or a mounting whereby the flexed end of the torsion rod is connected to the part to be yieldingly supported by the torsion rod. Such torsion rods are used, for example, in providing spring suspensions for automobile bodies or other vehicles as illustrated in my co-pending application for Vehicle spring suspension, Serial No. 713,161, filed February 27, 1934, four of such torsion rods being provided, and the dead end of each being anchored to the chassis of the vehicle and the flexed end being connected by a lever and link with one of the wheel spindles.

In providing a mounting for the ends of torsion rods it is important to avoid areas of high stress to insure that the stress is distributed uniformly along the torsion rod. For this reason it is undesirable to merely flatten the ends of such rods or to cut grooves into the rod since such methods reduce the effective diameter of the rod at the place of flattening or splining and result in an area in which the stress upon the torsion rod is concentrated. For this reason it has heretofore been the practice to enlarge the ends of torsion rods by upsetting or otherwise, and to provide splines in the enlargement, care being taken to avoid cutting the splines below the original diameter of the torsion rod. However, such procedure requires careful machining, both of the ends of the torsion rods and also of the mounting member into which each end of the torsion rod is fitted, it being necessary that such machining be carefully performed. It has also been proposed to anchor the ends of the torsion rods by bending them laterally or into the form of a gooseneck, but it has been found that when this is done excessive stress occurs at the start of the bend, this being, of course, as undesirable as cutting grooves below the original diameter of the rod.

It is the principal object of the present invention to so form the ends of the torsion rod as to avoid creating an area of concentrated stress and to entirely avoid the necessity of machining the rod to provide the necessary anchorage in the mounting members.

It is another object of the invention to provide a mounting for torsion rods in which the mounting member does not require accurate machining and in which all such expedients as splines or press fitting are avoided.

It is another purpose of the present invention to so form each end of the torsion rod and the mounting member that the spread of their contacting faces under stress is predominantly outwardly or away from the axis of the torsion rod. By this means the torsion rod is held under more favorable leverage rather than reduced leverage as wear or crushing takes place under continued stress.

Another object of the invention is to provide such a mounting which is particularly applicable to torsion rods which are continuously stressed in one direction only and which can be produced at low cost and by production methods.

In the accompanying drawing:

Fig. 1 is a fragmentary side elevation of one end of the torsion rod formed in accordance with my invention and mounted in a member which can be assumed to be a crank arm through which the torsion rod is stressed.

Fig. 2 is a vertical transverse section, taken on line 2—2, Fig. 1.

Fig. 3 is a transverse section, taken on line 3—3, Fig. 1 and showing the original or normal diameter of the torsion rod.

Figs. 4 and 5 are diagrammatic views illustrating the manner in which the ends of the torsion rod are expanded into the form illustrated in Figs. 1 and 2.

Fig. 6 is an exaggerated diagrammatic view illustrating the original line contact between the end of the torsion rod and the mounting member.

Fig. 7 is a view similar to Fig. 6 illustrating the effect of the crushing action between the rod and the mounting member and the manner in which the central line of contact progresses outwardly from the center as wear or crushing takes place.

The torsion rod 10 made in accordance with the present invention is made of spring steel and of such predetermined original or normal diameter as to provide the desired springing characteristics under the use for which it is selected. This normal or original diameter is illustrated in section in Fig. 3. The torsion rod is then cut to the desired length with due allowance for the shortening which occurs as hereafter described and one end is heated to a suitable temperature and placed in a die 11. This die is formed to provide a bore 12 in which the end of the torsion rod 10 is snugly fitted, the heated portion of this rod extending into an enlarged bore 13 in the die 11. This enlarged bore 13 is out of round and preferably of generally oval form in cross section, the bore preferably having closely spaced flat side walls connected by circular end walls. These walls taper and merge into the cylindrical bore 12 into which the torsion rod is snugly fitted. When so placed in the die 11 the heated end of the torsion rod is then expanded to assume the shape of the enlarged oval bore 13 of the die. This can be effected by forcing a male die 14 into the open end of the bore 13, the male die 14 being of the same shape and size as the bore 13 so that upon engaging the end of the torsion rod 10 this end is expanded to fill the inner end of the bore 13 and assume its form as best illustrated in Fig. 5. During this bulldozing operation the opposite end of the torsion rod can be held against an abutment 15. Following this the dies can be removed from the end of the torsion rod and its opposite end expanded into enlarged, generally oval form in the same manner. As a result each end of the torsion rod is enlarged and formed to provide opposite flat faces 20 and 21 connected by rounding faces 22 and 23, all of which faces taper inwardly and merge into the normal or original diameter of the torsion rod. It is important that the flat faces 20 and 21 be spaced a greater distance than the normal or original diameter of the torsion rod since otherwise an undesirable condition of high stress at the ends of the torsion rod would obtain.

One end of the torsion rod after being so formed is shown as being inserted in a socket 25 of a mounting member 26. This mounting member is illustrated as consisting of a crank arm secured to a spindle 27 which is journaled in any suitable manner in a frame bracket 28. The spindle 27 is substantially coaxial with the torsion rod 10 and hence as the crank arm 26 and spindle 27 swings it will be seen that the torsion rod 10 is stressed. For this purpose the socket 25 is made of generally oval cross sectional form, this socket having flat side walls 30 and 31 which merge into and are connected by semi-cylindrical end walls 32 and 33. It will therefore be seen that the socket 25 of the crank arm 26 generally conforms in cross sectional shape to the enlarged end of the torsion rod which it receives but a tight fit is not provided between the socket 25 and the end of the torsion rod, the socket being preferably at least one-thirty-second of an inch larger than the enlarged end of the torsion rod which it receives.

The invention is particularly applicable to installations where the torsion rod 10 is stressed in one direction only and it will therefore be seen that when the torsion rod and mounting member are fitted together a line contact obtains between the enlarged end of the torsion rod and the socket in which it is received. This line contact is illustrated by the dot-dash lines A in Fig. 6. In service the metal at the lines of contact A, A is spread into broad areas and as these areas are formed the longitudinal center lines of these areas move outwardly or away from the axis of the torsion rod. The longitudinal center lines of these areas are indicated by the dot-dash lines B in Fig. 7 and it will be seen that the lines B in Fig. 7 are disposed a substantial distance outwardly relative to the initial lines of contact A in Fig. 6. It will therefore be seen that as wear or crushing action takes place between the torsion rod and its socket a more favorable leverage obtains and a shortening of the leverage of connection between the torsion rod and socket is avoided. This is provided by deliberately making the socket 25 larger than the enlarged end of the torsion rod which it receives and by making the socket 25 and end of the torsion rod in the form illustrated. It will be understood that the diagrammatic illustration in Figs. 6 and 7 is exaggerated but an important feature of the invention resides in the provision of a slightly oversize socket 25 for receiving the end of the torsion rod.

It will also be understood that while the mounting member 26 is shown as comprising the crank arm secured to the stressed end of the torsion rod this mounting can also be in the form of a bracket for holding the dead end of the torsion rod.

From the foregoing it will be seen that the present invention provides a very simple and inexpensive mounting for the ends of torsion rods which can be produced by production methods uniformly and at low cost and which avoids all necessity of machining the torsion rod as well as the necessity of accurately machining the mounting member to which each end of the torsion rod is connected although it is apparent that the mounting member can be roughly bored to secure proper axial alignment of its socket with the torsion rod, such boring being within the means of the word "rough" as used in the accompanying claims. It will further be seen that the ends of the torsion rod are of greater diameter than the original or normal diameter of the torsion rod so that areas of concentrated stress are not produced, such as are produced if the rod is cut or otherwise reduced below its original or normal diameter or formed into a gooseneck or the like.

I claim as my invention:

1. A mounting for torsion rods, comprising a mounting member roughly formed with an elongated socket which is generally oval in cross section and a torsion rod having one end roughly expanded into oval form in cross sectional and nonrotatably fitted in said socket to engage the interior of said socket along two lines of contact only.

2. A mounting for torsion rods, comprising a mounting member roughly formed with an out of round elongated socket and a torsion rod having one end roughly expanded into generally similarly out of round form and nonrotatably fitted in said socket and said socket being substantially larger than the end of the torsion rod fitted therein, said end engaging the interior of said socket along two lines of contact only.

3. A mounting for torsion rods, comprising a mounting member roughly formed with an elongated socket which is generally oval in cross section and a torsion rod having one end roughly expanded into oval form in cross section and nonrotatably fitted in said socket and said socket being substantially larger in cross section than the cross section of the end of the torsion rod fitted therein, said end engaging the interior of said socket along two lines of contact only.

4. A mounting for torsion rods, comprising a mounting member roughly formed with an elongated socket which is generally oval in cross section and a torsion rod having one end roughly expanded into oval form in cross section and nonrotatably fitted in said socket and said socket being substantially larger in cross section than the cross section of the end of the torsion rod fitted therein, said end engaging the interior of said socket along two lines of contact only and the said two lines of contact between said torsion rod and mounting member progressively moving outwardly from the axis of said torsion rod as the adjacent areas of contact enlarge.

ALBERT F. HICKMAN.